United States Patent
Lindholm et al.

(10) Patent No.: US 7,917,946 B2
(45) Date of Patent: Mar. 29, 2011

(54) METHOD AND NETWORK FOR SECURELY DELIVERING STREAMING DATA

(75) Inventors: Fredrik Lindholm, Alvsjo (SE); Rolf Blom, Järfälla (SE); Karl Norrman, Stockholm (SE); Göran Selander, Solna (SE); Mats Näslund, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1488 days.

(21) Appl. No.: 10/472,526

(22) PCT Filed: Apr. 10, 2002

(86) PCT No.: PCT/SE02/00721
§ 371 (c)(1),
(2), (4) Date: Sep. 24, 2003

(87) PCT Pub. No.: WO02/084980
PCT Pub. Date: Oct. 24, 2002

(65) Prior Publication Data
US 2004/0117500 A1 Jun. 17, 2004

(30) Foreign Application Priority Data
Apr. 10, 2001 (SE) ...................................... 0101295

(51) Int. Cl.
| G06F 17/00  | (2006.01) |
| G06F 17/30  | (2006.01) |
| G06F 12/14  | (2006.01) |
| G06F 15/16  | (2006.01) |
| G06F 15/173 | (2006.01) |
| H04N 7/16   | (2006.01) |
| H04N 7/167  | (2006.01) |
| H04L 29/06  | (2006.01) |
| H04L 9/32   | (2006.01) |
| H04L 9/08   | (2006.01) |
| H04L 9/00   | (2006.01) |
| H04K 1/00   | (2006.01) |

(52) U.S. Cl. .................. 726/14; 726/4; 726/28; 726/29; 713/151; 713/153; 713/162; 713/163; 713/165; 713/168; 713/189; 380/201; 380/210; 380/231; 380/232; 380/233; 380/255; 380/279; 380/44; 725/25; 725/30; 725/31; 709/213; 709/217; 709/224; 709/231

(58) Field of Classification Search ................... 726/14, 726/4, 28, 29; 713/162, 163, 151, 153, 165, 713/168, 189; 725/25, 30, 31; 380/210, 380/231–233, 201, 255, 279, 44; 709/213, 709/217, 224, 231
See application file for complete search history.

(56) References Cited

U.S. PATENT DOCUMENTS
5,185,717 A * 2/1993 Mori .............................. 365/52
(Continued)

FOREIGN PATENT DOCUMENTS
EP 1 193 920 A2 4/2002
(Continued)

OTHER PUBLICATIONS
International Search Report mailed Aug. 16, 2002 in corresponding PCT application PCT/SE02/00721.
(Continued)

*Primary Examiner* — Aravind K Moorthy
(74) *Attorney, Agent, or Firm* — Nixon & Vanderhye P.C.

(57) ABSTRACT

In a procedure for delivering streaming media, a Client first requests the media from an Order Server. The Order Server authenticates the Client and sends a ticket to the Client. Then, the Client sends the ticket to a Streaming Server. The Streaming Server checks the ticket for validity and if found valid encrypts the streaming data using a standardized real-time protocol such as the SRTP and transmits the encrypted data to the Client. The Client receives the data and decrypts them. Copyrighted material adapted to streaming can be securely delivered to the Client. The robust protocol used is very well suited for in particular wireless clients and similar devices having a low capacity such as cellular telephones and PDAs.

34 Claims, 4 Drawing Sheets

U.S. PATENT DOCUMENTS

| | | | | |
|---|---|---|---|---|
| 6,275,471 | B1* | 8/2001 | Bushmitch et al. | 370/248 |
| 6,430,159 | B1* | 8/2002 | Wan et al. | 370/246 |
| 6,449,719 | B1* | 9/2002 | Baker | 713/168 |
| 6,608,841 | B1* | 8/2003 | Koodli | 370/474 |
| 6,757,273 | B1* | 6/2004 | Hsu et al. | 370/349 |
| 6,857,071 | B1* | 2/2005 | Nakae | 713/156 |
| 6,895,511 | B1* | 5/2005 | Borsato et al. | 726/5 |
| 7,099,846 | B1* | 8/2006 | Ishibashi et al. | 705/51 |
| 7,107,051 | B1* | 9/2006 | Walker | 455/432.1 |
| 7,412,598 | B1* | 8/2008 | Gleichauf | 713/155 |
| 2001/0020274 | A1* | 9/2001 | Shambroom | 713/201 |
| 2002/0156965 | A1* | 10/2002 | Gusler et al. | 711/100 |

FOREIGN PATENT DOCUMENTS

| | | |
|---|---|---|
| JP | 2000-48076 A | 2/2000 |
| JP | 2000-209562 A | 7/2000 |
| WO | 01/77800 A2 | 10/2001 |
| WO | 01/99374 A2 | 12/2001 |

OTHER PUBLICATIONS

International Preliminary Examination Report mailed Feb. 4, 2003 in corresponding PCT Application No. PCT/SE02/00721.
http://www.cselt.it/mpeg/; unable to access.
http://www.cacr.math.uwaterloo.ca/hac/.
http://www.ietf.org/rfc/rfc1889.txt.
http://search.ietf.org/internet-drafts/draft-ietf-avt-srtp-00.txt; unable to access.
http://www.ietf.org/rfc/rfc2326.txt.
http://www.ietf.org/rfc/rfc3095.txt.
http://www.ietf.org/rfc/rfc3096.txt.
http://search.ietf.org/internet-drafts/draft-ietf-rohc-rtp-09.txt.
http://www.cselt.it/mpeg/standards/ipmp; unable to access.
http://drogo.cselt.it/leonardo/opima/; unable to access.
http://www.idrm.org.
http://www.microsoft.com/windows/windowsmedia/en/wm7/drm.asp; unable to access.
http://www.verance.com/verance/technology.html; unable to access.
http://www.e-vue.com.
Japanese Notice of Rejection and English translation thereof mailed May 22, 2007 in corresponding Japanese application 2002-582586.
Ueno et al, "Prevention of Illegal Copying in a Digital-Contents Distribution System", IPS Technical Reports (2000-IM-36, 2000-EIP-7), Information Processing Society of JP, Jan. 29, 2000, vol. 2000, No. 13, pp. 17-24.

* cited by examiner

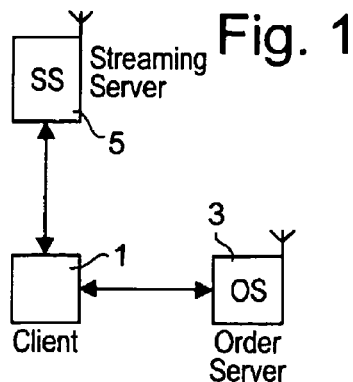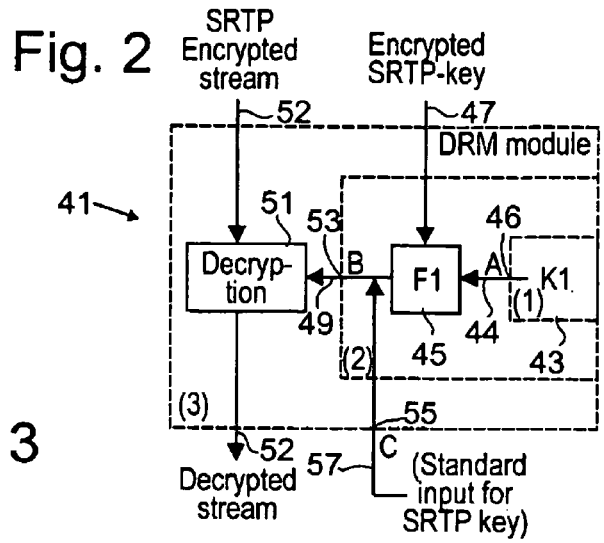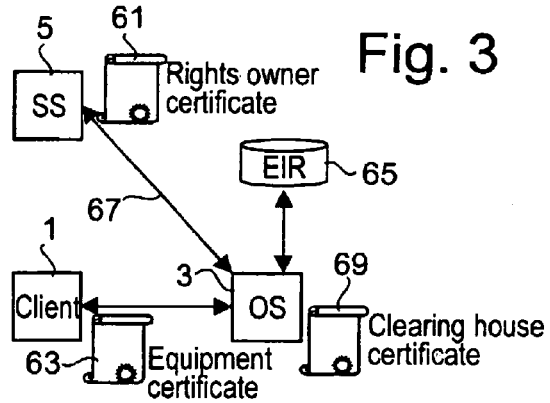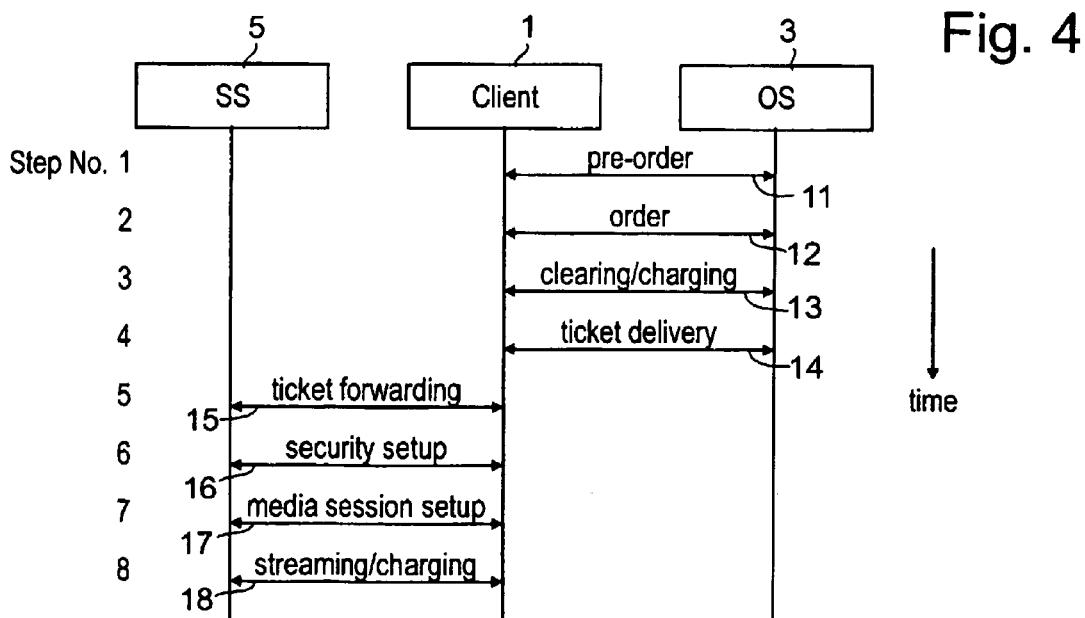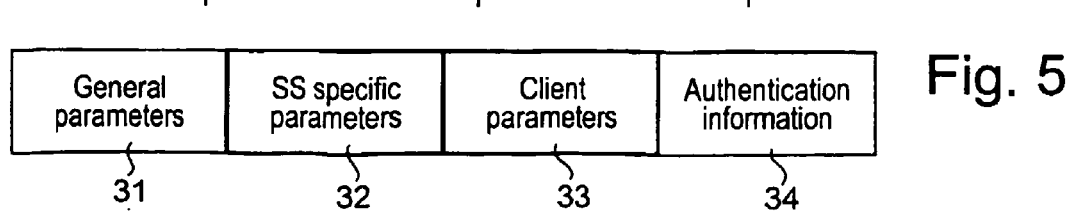

METHOD AND NETWORK FOR SECURELY DELIVERING STREAMING DATA

TECHNICAL FIELD

This application is the U.S. National phase of international application PCT/SEO2/00721 filed 10 Apr. 2002 which designates the U.S.

The present disclosure relates to a method of and a network for delivering streaming data from a streaming server to a client and to devices and servers used in delivering streaming data.

BACKGROUND

Digital communication technology offers convenient ways of distributing and copying data, but few means exist of protecting copyright controlled media against unauthorized access or re-distribution.

Some copyright owners have a strong economic interest of protecting their rights and this has lead to an increasing demand for Digital Rights Management (DRM). Generally, the protecting of copyright restricted data transmitted over an insecure channel requires cryptographic mechanisms such as authorization of legal users and encryption of the data. The management of the rights involves establishing trust relations, managing cryptographic keys and charging as well as a specification of the allowed utilization of the media.

A special difficulty arises in wireless networks or other communication systems exposed to disturbances. Due to the broadcast nature, eavesdropping is potentially very easy, which calls for encryption. But in this case, sensitive authentication information and/or encrypted data may be corrupted by errors during the transmission, which could break or distort the communication. Particularly sensitive data comprise real-time or other streaming media where there is little or no time to repair or re-send corrupted data. Moreover, encryption may have an impact on bandwidth economy, and may computationally overload a thin client such as a cellular telephone.

In the case of severely restricted storage capacity of the receiving device, e.g. a cellular telephone or a so-called "personal digital assistant" (PDA), it is not feasible to include DRM solutions that require large storage capacity. For the same reason it is not suitable or not even possible to have several different DRM solutions in one device. Therefore, a DRM solution should make as much use as possible of some pre-existing security architecture. On the other hand, the restricted environment in such a device also has benefits that should be exploited in a DRM solution. First, the limited storage restrictions are likely to prevent storage of the entire streaming data for later extraction. Second, it is not particularly easy to extract the digital contents from the device in any other shape; i.e. we may consider the device to be, or can with small means be turned into or include a so-called "tamper resistant module".

Most existing DRM solutions are partly based on "security by obscurity", i.e. the methods used are kept secret from the users. This makes it difficult to establish a trust in the solution from the point of view of the users. Second, though this obscurity admittedly makes attacks more difficult, this is only true as long as the obscurity is maintained. History has repeatedly shown that when someone eventually manages to reverse-engineer the solution, or when there is a "leak", security of the system is immediately compromised. Hence, a solution based on publicly known algorithms and protocols as far as possible has great benefits.

STATE OF THE ART

Various methods of content protection and rights management exist, but none is feasible for transmitting streaming data over an insecure medium exposed to disturbances. Solutions that may have some relevance to this subject are listed and briefly commented in the following.

Commonly used terms and abbreviations include the following:

DRM (Digital Rights Management): a general framework that may encompass one or more of the following techniques.

Cryptography, see A. Menezes, P. van Oorschot, and S. Vanstone: "Handbook of Applied Cryptography", CRC Press, 1997.

Watermarking: a process by which a data producer superimposes digital marks on the actual data so that the combined data can be tied to the data producer and so that the marking is resistant to tampering. That is, it should be difficult to completely remove the marks while maintaining a certain "quality" of the data. Watermarking is normally a software technique.

Copy protection: a process in which data are stored and distributed so as to make copying with a retained quality difficult and/or such that a copy can be traced back to the copier. Full protection usually requires special purpose hardware.

The following protocols for transport of real-time media will be referred to in the description hereinafter:

RTP (Real Time transport Protocol): IETF Proposed Standard for transport of real-time and streaming data, see Schulzrinne, H., Casner, S., Frederick, R., Jacobson, V., "RTP: A Transport Protocol for Real-Time Applications", IETF Request For Comments RFC 1889.

SRTP (Secure RTP or The Secure Real Time Transport Protocol): IETF Draft; security protocol for RTP encompassing encryption using an error-robust, relatively light-weight stream cipher that adds no extra header for the encryption, which makes transmission using SRTP less bandwidth consuming and less sensitive to disturbances compared to e.g. IPsec.

RTSP (Real Time Streaming Protocol): IETF proposed standard for controlling digital streams, much in the same way as a "remote control" for a audio/video device.

ROHC (RObust Header Compression): IETF Proposed Standard for compression of e.g. UDP and RTP-headers (as of Mar. 5, 2001). The compression decreases the size of the packet, which reduces the probability of bit errors and makes it more suitable for transport over noisy channels. Since SRTP only encrypts the RTP-payload, ROHC and SRTP are fully compatible.

Standardized Solutions

There are several standardization bodies discussing DRM and streaming media, the most mature standards work being the Intellectual Property Management and Protection (IPMP) in Moving Picture Experts Group (MPEG). MPEG IPMP offers a framework for DRM, but does not include the DRM in itself; it intentionally leaves this open for proprietary solutions.

Open Platform Initiative for Multimedia Access (OPIMA) works on the standardization of a framework for access control, content management and protection tools. It works on downloadable and/or replaceable security for Internet and pay TV applications, but does not address the wireless environment.

IETF (or more precisely its research group, IRTF) is presently setting up a study group for DRM.

Proprietary Solutions

The Microsoft Corporation has its Windows Media Rights Manager 7. This solution gives the user a possibility to buy a license at a so called clearing house, which can then be used to play a specific media that can be contained on a CD, in an e-mail or a streaming server. The licenses are tied to the computer, not to the user. The solution aims for the PC market in which both storage and processing resources are not restricted so that special purpose software can be downloaded and executed for the playback.

Verance claims to have a special wireless DRM, but the system seems only to be based on watermarking. Its solution does not seem to incorporate encryption of the streaming media.

E-vue manufactures MPEG-4 compliant encoding and authoring tools. No details are given on the site, but its network solutions are transport protocol independent, which would require inclusion of separate encryption on a higher level.

In the published European patent application EP-1041823 for Toshiba a system for secure MPEG-4 distribution is disclosed. It does not offer a real DRM solution; it mainly specifies how to encrypt MPEG-4 and include it in an RTP frame. After the encryption of MPEG-4, an extra encryption header is added to the payload. The encryption is not done at transport layer and requires special-purpose software and/or hardware.

In the published European patent application EP-1062812 for Intertrust a general DRM solution is disclosed using a so called secure container which could contain streaming media, control information and a device for opening the container and extracting cryptographic keys. No solution is explicitly offered for use in an environment exposed to disturbances. Also, since the keys are in the container, they must be extracted and verified before the streaming can be continued, which would have a large impact on the real-time requirements.

In the published International patent application WO 2000/52583 for Audible Inc. a framework is disclosed for authorization of playback device for playing streaming data, but no reference is made to encryption or ciphering despite the fact that transport over a secure medium is not assumed.

Problems

No DRM solution exists complying with real-time requirements in an environment exposed to disturbances. The existing solutions also require extensive storage in the client and/or special-purpose software and/or hardware. Existing DRM solutions are in general proprietary and do not use standard protocols, which require implementations of several DRM solutions in a client. This may be impossible if the storage capacity is scarce. In addition, the non-disclosure of the algorithms used makes them less credible to most users.

Another problem associated with existing solutions is that the digital rights are issued for a specific hardware or a small set of hardware devices, e.g. a PC and the possibility to copy the media once to a CD, as opposed to a specific user.

SUMMARY

It is an object of the one or more of the disclosed embodiments to provide a method and device for a robust and secure downloading of streaming data, in particular streaming data protected by copyright.

In the method disclosed herein existing secure transport protocols are used, this giving the benefit of an easy extension to DRM. Since cryptographic protection of the data content is already in place, it is in principle only necessary to extend the protocol by suitable AAA-like (Authentication, Authorization, and Accounting) mechanisms.

In the method and network the following components may be used:

A robust, lightweight, and secure standardized real-time transport protocol.
A key distribution mechanism.
A charging service.
A tamper-proof module.

Generally, in the method and network for accessing streaming data, e.g. data protected by copyright, the following events may take place but not necessary in the order given below:

A request or order from a client or client device for streaming data.
Authentication of the client.
Charging.
Transmission of the streaming data The parts interacting in the access of streaming media generally include a Client or client device, an Order Server (OS) and a Streaming Server (SS), the client ordering the media from the Order Server, the Order Server handling the media order and the Streaming Server delivering the streaming media to the Client.

The method and network offer a simple way of distributing material protected by copyright that is adapted to streaming purposes, real-time, possibly interactive data transfer being a special case. By using a robust protocol in the method and network, they are much more suited for wireless clients and heterogeneous environments than existing solutions. The advantage of using a standardized protocol, like SRTP, WTLS, etc., is that it can be implemented in many devices not only for the purpose of Digital Rights Management and therefore can be reused to significantly save storage capacity. This is crucial for client devices having low capacities such as cellular telephones and PDAs.

The proposed method and network and the components thereof, even the tamper resistant module which can be included in the client device, are or can be based on open standards and known algorithms. Is often difficult to evaluate other DRM solutions because they are partly based on "security by obscurity", i.e. they may depend on secret procedures or implementations. Since secret algorithms protecting a desired object has a tendency to eventually become public, e.g. the GSM encryption algorithm, DVD encryption algorithms, etc., such solutions are generally considered to be weak in the cryptography region: they are not open to public scrutiny before implementation. In this case, as in all contemporary public cryptography, the strength of the procedure once evaluated will rely on the keys and the key management.

Another advantage of an open, largely standardized solution is that anyone can use it to protect and distribute his/her data. For instance, a relatively unknown "garage rockgroup" or an independent film maker or writer, can in a simple, low cost way, distribute their works to a greater audience in a secure way. One can envision a web-portal hosting producers of such works.

Another advantage, when using the method and network as described herein, for a special-purpose thin client, is that it is much less feasible for a "hacker" to access or store the streaming data than in the case where the receiver is a more open and powerful device such as a personal computer. Though it may still be possible to record an analog output signal, the high quality digital signal should be well protected inside the device. In other words the thin client can for many practical purposes in itself be considered a tamper resistant device. In contrast to the build-your-own environment for personal computers, where it is potentially very simple to bypass a hardware copy protection, it is much easier to obtain security in the more controlled manufacturing of cellular telephones and other portable devices. In fact, manufacturers may obtain security certification of their products.

If this is coupled to an additional DRM module and watermarking, the copyright protection is as good as in any existing solution.

If the Order Server is managed by an operator and the Client has a subscription with this operator, this trust relation can be exercised for authentication and charging purposes. Assuming further that the Streaming Server is a content provider, if an operator and a content provider cooperate with each other, e.g. in the form of a music download portal, the user trusting the operator has a reason to feel more secure against fraud from pirate or spoofing content providers.

The method and network are very flexible in the sense that they can provide different levels of anonymity for the Client depending on the actual implementation. For instance, a totally anonymous solution can be obtained with respect to the Streaming Server, the Order Server, and also possible financial institutions involved, by using anonymous digital payments for access and content payment. On the other extreme end of the spectrum, a very tight connection to the user can be obtained by using an Identity Module and possible watermarking techniques. From the point of view of an operator or a content provider this could be very attractive, since it gives better means for tracking down an unlawful copy to the user who provided the copy.

Since the Streaming Server is housing the media and also can make the final validation of the request before transmitting the data, the Streaming Server has maximum control over the media.

The Order Server initiated request also gives an extra benefit in a multicast scenario, e.g. in Internet TV, Video/Radio Broadcasting.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a general block diagram illustrating an elementary network comprising parts involved in a procedure for delivering streaming media from a Streaming Server to a Client which requests the media from an Order Server, FIG. 2 is a block diagram illustrating the functions of a DRM module of a Client, FIG. 3 is a block diagram illustrating optional trust management in the network of FIG. 1, FIG. 4 is signalling diagram illustrating steps executed in delivering streaming data, FIG. 5 is schematic diagram showing the basic parts of a digital ticket.

DETAILED DESCRIPTION

In a system for ordering and receiving streaming media the interaction of three nodes, a Client 1, an Order Server (OS) 3 and a Streaming Server (SS) 5 which form an elementary network, will now be described, see FIG. 1.

Figure 6:
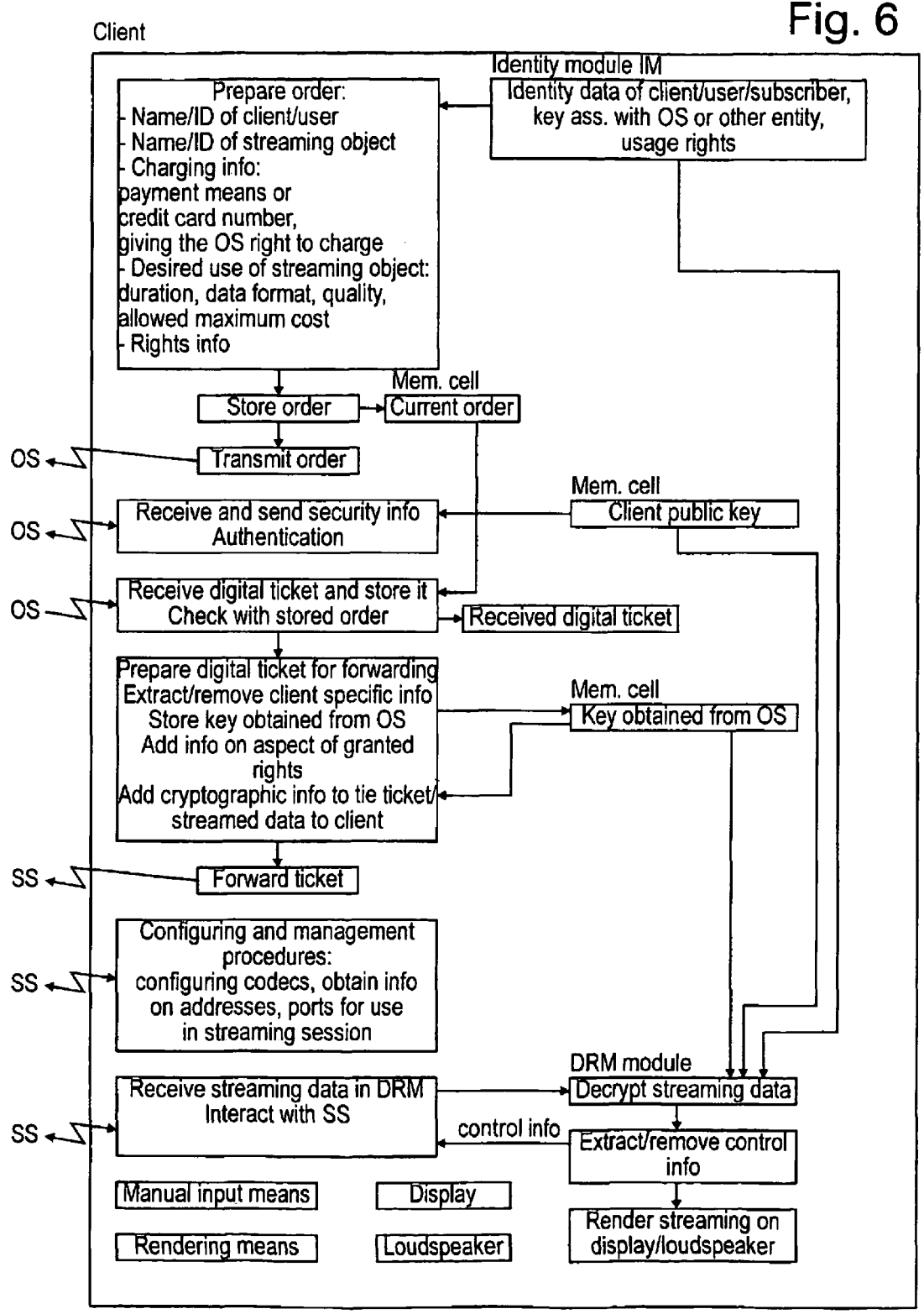
FIG. 6 is a schematic block diagram of a Client showing some basic components thereof, some of which may be optional and some which are alternatives.

The Client 1 may be a device having a limited processing and storage capacity, e.g. a cellular telephone, a PDA, etc, having conventional manual input means and means for rendering streaming data on a display and/or by a loudspeaker, see also the block diagram of FIG. 6. The Client may optionally have built-in special-purpose DRM tamper-resistant soft- or hardware modules. These modules may be associated with a content provider, a financial institution, or a network operator. The Client may optionally also contain or be connected to an Identity Module (IM), which is a tamper resistant device containing data of the user or a subscription, e.g. a SIM card, a smart card, etc. The IM may be issued by a content provider, a network operator or a third party such as a bank.

Figure 7:
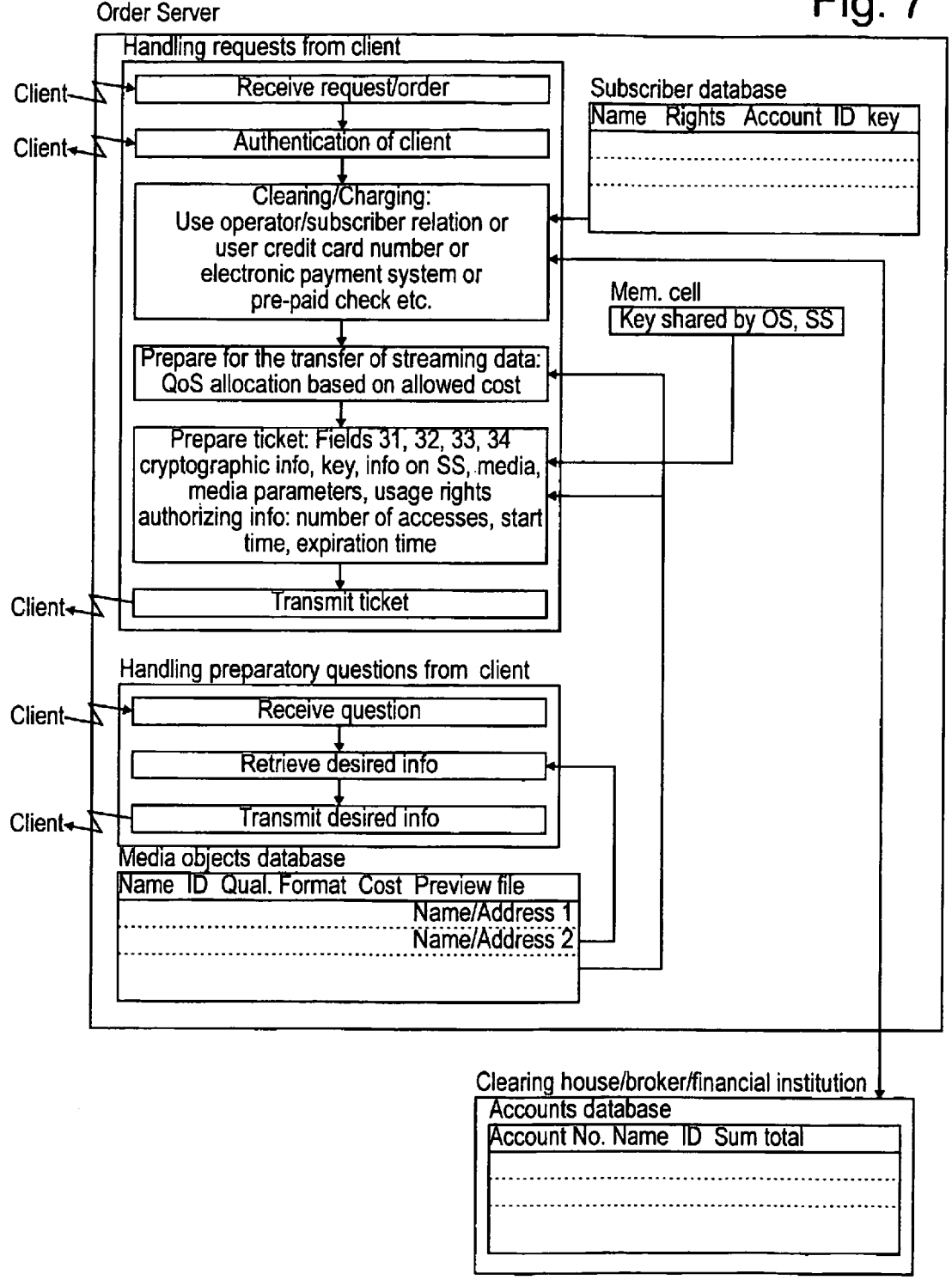
FIG. 7 is a schematic block diagram of an Order Server showing some basic components thereof, some of which may be optional and some which are alternatives.
Figure 8:
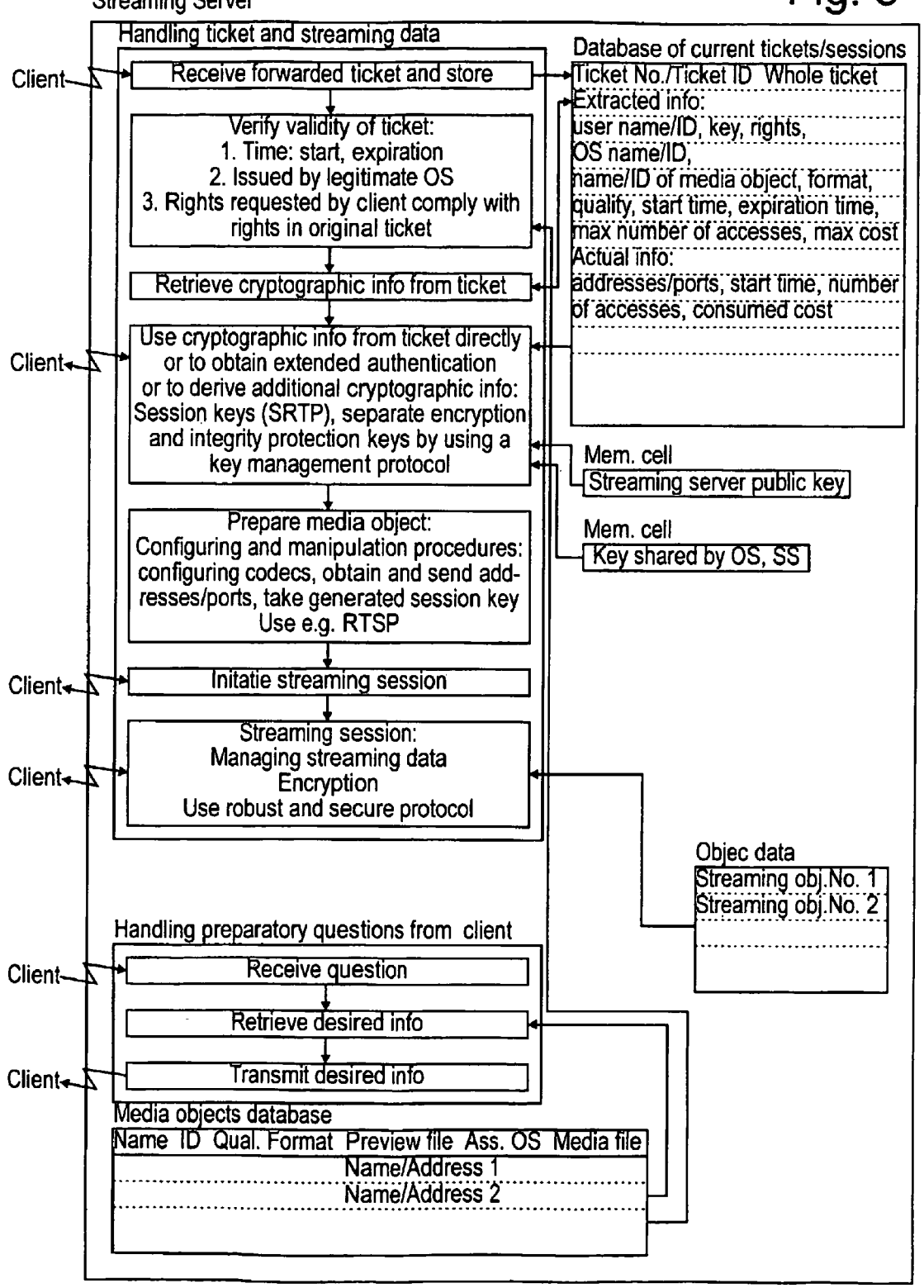
FIG. 8 is a schematic block diagram of a Streaming Server showing some basic components thereof, some of which may be optional and some which are alternatives.

The Order Server OS 3 handles the requests from the Client and manages primarily the charging related to the requested media, see also the block diagram of FIG. 7. The Streaming Server 5, see also the block diagram of FIG. 8, houses and manages the streaming data according to conditions set by the Order Server and by the Client.

In a practical situation the Order Server 3 and the Streaming Server SS 5 may be integrated with each other or the tasks described herein that are performed in any of the Order Server and Streaming Server may be allocated to two or more servers.

The procedure for obtaining/delivering streaming media starts with the Client 1 presenting a request for a certain object of streaming media to the Order Server 3. This request may also contain additional information for charging purposes, such as means of payment, credit card number or other monetary information and desired usage of the streaming data, such as duration, format of media, etc. As a response to the Client request, the Order Server 3 may performs tasks like authentication of the Client, charging and preparation for the transfer of the media object requested. The preparation may include QoS (Quality of Service) allocation, which in turn can be associated with the amount of money that the user is willing to pay for the service. The charging may for instance utilize a pre-existing operator-subscriber relation between the Client 1 and the Order Server 3, a credit card number provided by the Client or an anonymous, e.g. electronic, payment system. Alternatively some kind of pre-paying mechanism may be used. If the request is granted, the Streaming Server 5 can stream the media object to the Client over a standardized, robust and secure protocol, such as SRTP, WTLS, etc. or other protocols adapted for this purpose. If the media utilization agreement made so allows, the streaming may be controlled by the user via a protocol like the RTSP. An example of this may be a user at a sports arena who wants to see slow motion replays of an ice hockey match event from several different angles. Such control signalling may need to be authenticated so that only the intended receiver of the stream can control it.

The use of a standardized protocol allows that already existing implementations are reused, which is helpful to a client 1 that is thin, i.e., has limited storage resources.

A robust transport allows a relatively high bit error rate without severely affecting performance of the streaming data.

The streaming data is encrypted in order to make it possible to protect the content of the data from any unauthorized entity getting access thereto.

A high-level protocol for Digital Rights Management will now be described in more detail, with a focus on authorization, key management and charging. As mentioned above, the implementation may make use of special purpose soft- or hardware if such exists. Thus, with reference to FIG. 4 a high-level protocol for Digital Rights Management will now be described. The different steps performed in the protocol are denoted by arrows connecting the Client 1 and the Order Server 3 to each other and arrows connecting the Client and the Streaming Server 5 to each other.

Step No. 1, Arrow 11: Pre-Order

Before the Client 1 actually orders some media object some actions may be taken in communicating between the Client and the Order Server 3, such as finding information on media type, quality, pricing, previewing, etc. Some of this information can possibly also be obtained from the Streaming Server 5, such as lists of available media objects, information whether they can be obtained through the Order Server 3, data types, preview files.

Step No. 2, Arrow 12: Order

The Client 1 is involved in communication with the Order Server 3 resulting in a formal order or order-request of some specific media object sent from the Client to the Order Server, e.g. over WAS, HTTP or I-mode, certain rights being associated with the order. The receiving of the order request initiates a sequence of actions that may include exchange of security information, such as authentication of the Client, to be used in the order process and/or in the charging process and/or in the ticket creation process to be described below.

Step No. 3, Arrow 13: Clearing/Charging

The request of step No. 2 also initiates a clearing or charging action, in the normal case where the media object, actually the contents thereof, is charged for. The Client 1 specifies how to pay for the order, in the order message or by some pre-existing agreement, and grants the Order Server 3 the right to charge. The Order Server may optionally be in contact with a clearing house/broker to handle the charging request, such as to check that there is a sufficient amount of money on the user's account, etc.

Step No. 4, Arrow 14: Ticket Delivery

The Order Server 3 then creates a digitally signed ticket or digitally signed tickets, which it sends back to the Client 1. Such a ticket is a receipt of the order and contains information of the agreement that is necessary for the Client in order to obtain the requested media object from the Streaming Server 5 and to retrieve the contents thereof. This might be information about the Streaming Server and about requested media, cryptographic information, such as a key and other parameters for the streaming data, and usage rights or conditions, i.e. authorization information, for the requested media, e.g. the number of accesses allowed, initiation and expiration time. When receiving the ticket the Client 1 may check that the contents of the ticket coincides with the previously made order.

Step No. 5: Ticket Forwarding

To initiate the delivery of the media, the whole ticket or preferably a special part of the ticket is sent from the Client 1 to the Streaming Server 5. Alternatively, information derived from the received ticket can be sent to the Streaming Server. Optionally, the Client may add information on the aspect of the granted rights to the media that is requested in the media session setup step to be described below. Additional data may also be added to cryptographically tie this information to the Client, via the cryptographic information put into the ticket by the Order Server 3. The Streaming Server verifies the validity of the ticket, e.g. that it still is valid, that it was issued by a legitimate Order Server, that the rights requested by the Client comply with the rights written in the ticket, etc.

Step No. 6: Security Setup

The cryptographic information conveyed in the ticket can either be used directly or to obtain extended authentication and/or to derive additional cryptographic information, such as session (SRTP) keys, separate encryption and integrity protection keys, etc. Such keys may be derived, e.g. by using a key management protocol.

Step No. 7: Media Session Setup

If the ticket is valid, preparation of the actual streaming of media is made. Thus, in order to render the media, certain configuration and manipulation procedures may be necessary, such as configuring codecs, transmitting originating and destination network addresses and ports, fast forward to desired locations, etc. This may be handled by a control protocol, such as the RTSP.

Step, No. 8: Streaming/Charging

After all preparations having been made, the Streaming Server 5 starts streaming the media to the Client 1 in accordance with what is ordered. The Client receives the data and decrypts it, typically "on the fly" in real-time, using the previously obtained key. Optionally, if the agreement allows, the Client 1 may interact with the Streaming Server, using e.g. RTSP, to control the media flow according to what it wishes. Additional charging may be used to allow e.g. volume or time based pricing of media. This type of charging does not require any additional payment from the Client 1, but rather marks consumption of the ticket, by using up its rights. For example, in the case of time based charging, the ticket may contain some amount of time distributed over a certain set of media. The Streaming Server 5 may record the time used and send receipts to the Client. Similarly, for volume based pricing the Streaming Server may record the amount of data streamed instead of time.

Optionally, if the ticket expires, the Client can again contact the Order Server 3, in the case where it wishes to continue the streaming. This re-negotiation may use previously exchanged information, and can therefore be a faster and more lightweight transaction to reduce interruption of the data flow. The protocol then proceeds from step No. 5.

Examples of Ticket Content

The digital tickets may contain various information, which may depend on the relations between the Order Server 3, the Streaming Server 5 and the Client 1, the existence of a Public Key Infrastructure (PKI), and a hardware identity of the media player, i.e. of the Client. The tickets could contain information on the requested media, the usage conditions allowed and they can also act as receipts or vouchers for the associated economic transaction.

1. If the Order Server 3 and the Client 1 have an operator/subscriber relation, one ticket may contain the session key, e.g. the SRTP key, encrypted with some secret data manifesting the relation, such as a cryptographic key known to the Order Server and which may be contained in an Identity Module in the Client. Another ticket may contain the session key encrypted with a public key belonging to the Streaming Server 5. The former ticket may act as a receipt for the Client whereas the latter ticket may act as a token to be shown or passed to the Streaming Server at the final request for the media.

2. If the Client 1 has a known public key, the Order Server 3 may leave the generation of the session key to the Streaming Server 5, and the tickets may not carry this information.

In either case, tickets may optionally contain the identity of the playing device, i.e. of the Client, such as an IP address, a hardware identity etc. Tickets may contain a time stamp, a counter value or something e.g. to indicate the freshness of a ticket or to prevent unauthorized replay. A ticket sent from the Order Server 3 aimed for the Streaming Server 5 may contain a Client identifier, with which the Streaming Server may e.g. watermark the media. It can provide anonymity to the Client except in the case of copyright infringement, in which case the Order Server may reveal the identity connected to this identifier.

Also the tickets may be optionally digitally signed by the Order Server, e.g. with a public key belonging to the Order Server for integrity protection, e.g. to protect against spoofing.

A ticket may e.g. contain the following fields, see FIG. 5:

A field 31 for general parameters. These parameters may contain information that both the Client 1 and the Streaming Server 5 have to receive, e.g. identities, information on rights, authentication and encryption algorithms.

A field 32 for streaming server specific parameters. The contents of this field cannot be accessed by the client and may contain information necessary for the streaming server 5 to establish a cryptographic relation with the client 1. A cryptographic key encrypted by the order server 3, that can be decrypted by the Streaming Server is included. This can be done using the streaming server public key or a key pre-shared between the streaming server and the order server. The same cryptographic key is also included in the client parameters, see below. A special embodiment of the cryptographic key is the SRTP key or a key that can be used to derive the SRTP key.

A field 33 for Client specific parameters. This field may contain information necessary for the Client 1 to establish a cryptographic relation with the Streaming Server 5. A Client decipherable cryptographic key encrypted by the Order Server 3 that can be decrypted by the Client is included. This can be done by using the Client public key or key pre-shared between the Client and the Order Server.

A field 34 for authentication information. This fields contains information for the streaming server 5 and the client 1 for verifying the validity of the ticket. Either the field contains a signature made with the order server public key which both the streaming server 5 and the client can verify or it contains two parts, one part of which can be verified by the streaming server and another part-of which can be verified by the client. The latter can be achieved using a message authentication code using keys pre-shared by the order server and the streaming server, and by the order server and the client, respectively.

It can be observed that using the procedures described above it is very easy to tie access rights for the media to the user, i.e. an identity, rather than to the hardware to which the downloading is made. This can be accomplished, for instance, by using an Identity Module, such as an SIM card in a mobile terminal, involved in the transactions. Alternatively a credit card number can serve this purpose. By using anonymous, electronic, payments, the access is tied to the user without revealing his identity.

To further enhance security against unlawful copying or playback, the controlled environment in a mobile terminal can be easily extended by an optional hardware security module. Such a module can prevent or control transmission of the data to an external digital device and/or put a watermark to the signal based on the user identity so that the user can be traced. An example of such a module will now be described.

The DRM Module

A DRM module, such as a special purpose tamper resistant integrated circuit or a physically protected device, may be optionally included in the Client 1 to make it even more difficult to prevent unlawful access to the media. In the block diagram of FIG. 2 the functions of such a module 41 for an SRTP based solution are illustrated.

It is preferred that the module at least (1) contain some secret data K1 stored in a secure memory 43, such as a cryptographic key, which may be a resource common to or stored in the IM. This data can be utilized to tie the usage rights to a subscriber identity or a device. It may also (2) include a device F1, 45 for performing a decryption algorithm or cryptographic one-way function, which takes as input the secret data k1 delivered from the secure memory 43 on a line 44 comprising an interface a, 46, and the encrypted SRTP key, as provided on an input line 47 of the module 41, and produces as output the decrypted SRTP key on a line 49. A third version (3) the module 41 may also contain the entire SRTP decryption functionality, as illustrated by the block 51, to which the decrypted SRTP key is provided on the line 49. The SRTP decryption block 51 receives the data of the encrypted media stream on a line 52 input to the module and delivers a decrypted stream of data on a line 52' output of the module 41. In this way, the SRTP key, which passes in clear text over an interface B at 53 in the line 49 is entirely protected within the module 41. In this case it may be advantageous to allow an interface C, 55 at an input line 57 to the module to insert a key into the interface B 53, so that this SRTP implementation can be reused for other purposes. The function F1 in the block 45 will in such a case prevent unauthorized use, when somebody attempts to override the DRM functionality.

For example, the use of the DRM module 41 can be as follows. First, the digital ticket is received by the Client 1 and the streaming session is set up, Steps Nos. 5-7.

The encrypted SRTP key is provided to the DRM module 41 on the input line 47. The key is received by the function block F1 45 that uses it and the secret information K1 stored in the secure memory 43 to produce the plain text SRTP key that is provided to the line 49 and appears on the B interface 53 and is accessed by the SRTP decryption block 51.

The incoming encrypted SRTP stream can now be provided to the DRM module 41 on the input line 52, is decrypted by the block 51 and the plain text RTP packets are delivered from the decryption block on the output line 52'.

It is not possible to extract the keys available on the B interface 53 outside the DRM module 41. However, it is possible to enter plain text SRTP keys on the C interface 55 in input line 57 and thereby use the DRM module also for decrypting SRTP streams when the plain text SRTP key is known. It can be observed that decrypting and encrypting according to the SRTP can be done in the same way and that the DRM module 41 thus can be used for encrypting as well as decrypting in the case where the plain text SRTP key is known.

Though less likely, in the most extreme case, not shown, the Client could be a wireless device with an antenna input and an e.g. analog audio output, where everything connected in-between is implemented in a tamper resistant way.

Trust Management

To provide trust management in the case where there is no pre-existing relation, and/or authentication between the communicating parties the following optional "certificate" structure can be used, as illustrated by the block diagram of FIG. 3. With certificate is meant some data confirming the identity and/or rights of a certain party or equipment.

The Order Server 3 may want to ensure that the Streaming Server 5 has the rights to the streaming media for which the Order Server is charging, and this may be demonstrated by utilizing a certificate 61 issued by a rights owner. The ownership of this certificate may be demonstrated to the Order Server at appropriate time/times. This certificate may also be obtained dynamically, during the order process.

The Streaming Server 5, on the other hand, may want to know that the Client 1 has lawful equipment to handle the media without violating the given rights, and also that the equipment is not malfunctioning and/or stolen or otherwise illegally obtained. For this purpose the Client's equipment may optionally contain a certificate 63 or token issued by the manufacturer of the equipment to prove e.g. that it is original equipment, that it contains the relevant DRM module 41, etc. If the Order Server 3 is managed by an operator, the Order Server may check whether the equipment is registered in a database, which keeps track of stolen, unauthorized or defective equipment, such as the GSM network's Equipment Identity Register (EIR) 65, see "GSM System Survey", Ericsson Student Text, EN/LZT 123 3321 R3A.

The Streaming Server 5 may also want to protect from a "false Order Server" attack, wherein a Client 1 is claimed to have paid for a certain media object without having done so. This may be resolved by the mechanisms described above, if an established agreement between the Order Server 3 and the Streaming Server exists, see the arrow 67 of FIG. 3. Such an agreement can be created by e.g. the use of a Clearing house certificate, see item 69, issued by a party that the Streaming Server trusts, and which indicates that the Order Server should be a trusted party. This certificate may also be obtained dynamically, during the order process.

An example will now be described in which a preferred method is executed.

The Client 1 finds, by surfing on the World Wide Web from a wireless terminal, an offer to buy/view a rock video-clip for limited use, e.g. a time period of 30 minutes. The Client also decides to pay a little extra for Hifi-quality audio. The Client specifies the desired media and usage and agrees on the price. The Order Server 3 receives this information and charges, based on a previous contractual agreement with the Client such as e.g. a telephone or Internet subscription. The Order Server also checks the status with the Streaming Server 5 to see that the requested media can be delivered according to the specified conditions or that the Streaming Server reserves capacity therefor. The Order Server produces a ticket and sends it, encrypted and signed/authenticated, to the Client with the following contents: a reference to the requested data, e.g. a file name, a session encryption key for the SRTP stream, a freshness token to protect against replay, information on the validity period, i.e. 30 min, QoS data, and the identity and address of the Client and the Streaming Server. From the ticket, the Client 1 extracts the data, most importantly the session key, and forwards it in encrypted shape to the Streaming Server 5 along with the authorization of the Order Server, i.e. the signature/authentication tag of the Order Server. The Streaming Server extracts the ticket content, checks freshness and authorization of the Client made by the Order Server 3.

Finally, the Streaming Server starts to send the encrypted stream to the Client. The DRM module 41 in the Client produces a decrypted stream, as described with reference to FIGS. 1, 2 and 4, which is played on the device. Halfway through the video, the Client is disturbed by a local noise. Over RTSP, the Client "rewinds" the stream a bit, and restarts the media stream sent from the Streaming Server 5 from that point. The Client may need to accompany the control request with the ticket, or information derived therefrom, so that the Streaming Server can check the validity. The RTSP messages may also be authenticated by the Client, so that no one else can take control over the streaming, or do denial of service.

Additionally, the Streaming Server 5 may confirm the transaction of the media with the Order Server 3 so that the charging is not done until the actual media has been delivered. Alternatively, acknowledgments of delivery may be sent from the Streaming Server to the Order Server prior to or during the transaction, to allow flexible charging, e.g. proportional to the time spent or to the amount of data actually delivered.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of securely obtaining objects of streaming data, the method comprising:
   a client device ordering from an order server a delivery of a specific object of streaming data to be obtained by the client device in a streaming fashion;
   the order server receiving the order;
   in response to the order, the order server transmitting a first ticket to the client, wherein the first ticket includes a session key;
   the order server transmitting a second ticket to the client device, wherein the second ticket includes the session key and the second ticket is protected for access only by a streaming server;
   the client device forwarding the second ticket to the streaming server, the second ticket including a request to obtain the specific object of streaming data;
   the streaming server encrypting the streaming data of the specific object using the session key and a robust and secure transport protocol and transmitting the encrypted streaming data of the specific object to the client device; and
   the client device receiving and decrypting the encrypted streaming data of the specific object.

2. The method of claim 1, wherein in the step of transmitting the second ticket, cryptographic information is transmitted in the second ticket to be used by the streaming server in the step of encrypting the streaming data of the specific object and by the client device in the step of decrypting the streaming data of the specific object.

3. The method of claim 2, wherein said cryptographic information is transmitted in a way making it impossible for the client device to access the cryptographic information.

4. The method of claim 3, wherein said cryptographic information included in the second key is transmitted in an encrypted form.

5. The method of claim 1, wherein ordering the delivery of the streaming data of the specific object includes transferring charging information from the client device to the order server.

6. The method of claim 1, wherein the robust and secure transport protocol includes a standardized real-time protocol.

7. The method of claim 1, further comprising selecting the robust and secure transport protocol to be insensitive to occasional errors during transmission.

8. The method of claim 7, further comprising selecting the robust and secure transport protocol to be capable of correcting occasional errors.

9. The method of claim 8, wherein the robust and secure transport protocol is selected so that said occasional errors include delay or distortion.

10. The method of claim 7 further comprising selecting the robust and secure transport protocol so that occasional errors have little effect on the transmitted data.

11. The method of claim 10, wherein the robust and secure transport protocol is selected so that said occasional errors include delay or distortion.

12. The method of claim 1, wherein the transport protocol includes a Secure Real Time Protocol.

13. The method of claim 1, wherein the transport protocol includes a Robust Header Compression protocol.

14. The method of claim 1, further comprising storing an identity of the client device in a tamper resistant identity module.

15. The method of claim 1, further comprising storing usage rights of a user of the client device in a tamper resistant identity module.

16. The method of claim 1, wherein in the step of transmitting the encrypted streaming data of the specific object, the transmitting is performed wirelessly.

17. The method of claim 1, further comprising associating an identity of the client device with a user.

18. The method of claim 1, further comprising associating an identity of the client device with an IP address of a user.

19. The method of claim 1, wherein in both the first and second tickets are transmitted from the order server to the client device in a single transmission.

20. A client device for communication with an order server and a streaming server for securely obtaining objects of streaming data from the streaming server, the client device having an identity, the client device comprising:
  an ordering unit configured to prepare and transmit an order to the order server for delivery of an object of streaming data;
  a ticket receiving unit configured to receive a first ticket and a second ticket from the order server;
  a ticket forwarding unit configured to forward the second ticket to the streaming server including a request to obtain the ordered object of the streaming data; and
  a streaming data receiving unit configured to receive the streaming data of the ordered object,
  wherein the second ticket received from the order server by the ticket receiving unit and forwarded by the ticket forwarding unit includes a session key used by the streaming server to encrypt the streaming data of the ordered object received by the streaming data receiving unit, and
  wherein the first ticket also includes the session key.

21. The client device of claim 20, further comprising a decrypting unit configured to decrypt the streaming data of the ordered object received by the streaming data receiving unit.

22. The client device of claim 21, wherein the ticket forwarding unit is arranged to forward in said second ticket cryptographic information to be used by the streaming server for encrypting the streaming data of the ordered object to be transmitted to the client device.

23. The client device of claim 20, wherein the ticket receiving unit is arranged to extract cryptographic information from the first ticket to be used for decrypting the streaming data of the ordered object received by the streaming data receiving unit.

24. The client device of claim 20, wherein the second ticket is not accessible by the client device.

25. The client device of claim 20, wherein in both the first and second tickets are received from the order server in a single transmission.

26. A network for securely obtaining objects of streaming data, including:
  a client device;
  an order server; and
  a streaming server,
  wherein the client device comprises:
    an ordering unit configured to prepare and transmit an order to the order server for delivery of an object of streaming data,
    a ticket receiving unit configured to receive first and second tickets from the order server,
    a ticket forwarding unit configured to forward the second ticket to the streaming server including a request to obtain the ordered object of streaming data, and
    a streaming data receiving unit configured to receive the streaming data of the ordered object,
  wherein the order server comprises:
    an order receiving unit configured to receive from the client device the order of the object of the streaming data, and
    a ticket unit configured to prepare the first and second tickets and transmitting the first and second tickets to the client device, wherein the first ticket includes a session key and the second ticket includes the session key, the second ticket protected for access only by the streaming server, and
  wherein the streaming server comprises:
    a storage configured to store a plurality of objects of streaming data,
    a ticket receiving unit configured to receive the second ticket from the client device,
    an extracting unit operatively connected to the ticket receiving unit and configured to extract information from the second ticket, wherein the extracted information including an indication of an object of the streaming data stored in the streaming server, and
    a session download unit operatively connected to the extracting unit and configured to download the indicated object of the streaming data to the client device.

27. The network of claim 26, wherein the extracting unit is arranged to extract information of a key from the second ticket and the session download unit is arranged to encrypt the streaming data of the ordered object using the key in the downloading operation.

28. The network of claim 26, wherein the extracting unit is arranged, in order to extract information of a key from the second ticket, to decrypt respective information in the second ticket.

29. The network of claim 26, wherein the session key included in the second ticket is used by the streaming server to encrypt the streaming data of the ordered object downloaded by the session download unit.

30. The network of claim 26, wherein in both the first and second tickets are transmitted from the order server to the client device in a single transmission.

31. A method of securely obtaining objects of streaming data, comprising:

generating, by a client device, an order for an object of streaming data;

transmitting the order from the client device to an order server;

generating, by the order server, a response ticket based on the order, wherein the response ticket includes a first portion decipherable by the client device and a second portion not decipherable by the client device;

transmitting the response ticket from the order server to the client device;

forwarding at least the second portion of the response ticket from the client device to a streaming server;

deciphering, by the streaming server, the second portion of the response ticket to extract an encryption key;

encrypting, by the streaming server using the encryption key, the streaming data of the ordered object;

transmitting the encrypted streaming data from the streaming server to the client device;

deciphering, by the client device, the first portion of the response ticket to extract a decryption key; and decrypting, by the client device using the decryption key, the encrypted streaming data of the ordered object received from the streaming server, wherein the decryption key deciphered by the client device and the encryption key deciphered by the streaming server are the same.

32. The method of claim 31, wherein the step of generating the response ticket by the order server comprises encrypting the decryption key into the first portion of the response ticket using a public key of the client device or a key pre-shared between the client device and the order server.

33. The method of claim 31, wherein the step of generating the response ticket by the order server comprises encrypting the encryption key into the second portion of the response ticket using a public key of the streaming server or a key pre-shared between the streaming server and the order server.

34. The method of claim 31, wherein the response ticket is transmitted from the order server to the client device in a single transmission.

* * * * *